(12) United States Patent
Phillips

(10) Patent No.: US 6,684,084 B1
(45) Date of Patent: Jan. 27, 2004

(54) APPARATUS FOR PROVIDING OPERATIONAL POWER TO A RADIOTELEPHONE CARD CONNECTED TO A PCMCIA INTERFACE

(75) Inventor: George Eric Phillips, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 509 days.

(21) Appl. No.: 09/107,795

(22) Filed: Jun. 30, 1998

(51) Int. Cl.$^7$ .................................................. H04B 1/38
(52) U.S. Cl. ..................................... 455/558; 455/575.7
(58) Field of Search ................................. 455/557, 558, 455/575, 90, 128, 129, 556.1, 556.2, 575.1, 575.4, 575.7, 550.1; 375/222; 364/705.05, 705.01

(56) References Cited

U.S. PATENT DOCUMENTS

| | | | |
|---|---|---|---|
| 5,487,099 A | * | 1/1996 | Maekawa .................... 455/558 |
| 5,594,952 A | * | 1/1997 | Virtuoso et al. ............ 455/557 |
| 5,628,055 A | * | 5/1997 | Stein .......................... 455/575 |
| 5,708,833 A | | 1/1998 | Kinney et al. .............. 455/128 |
| 5,845,217 A | * | 12/1998 | Lindell et al. .............. 455/557 |
| 5,873,045 A | * | 2/1999 | Lee et al. ................... 455/558 |
| 5,896,574 A | * | 4/1999 | Bass, Sr. .................... 455/557 |
| 5,963,872 A | * | 10/1999 | Stein .......................... 455/557 |

\* cited by examiner

Primary Examiner—Sinh Tran
Assistant Examiner—Eliseo Ramos-Feliciano
(74) Attorney, Agent, or Firm—Myers Bigel Sibley & Sajovec, P.A.

(57) ABSTRACT

An adapter attaches to a radiotelephone card connected to a PCMCIA interface within an electronic device and is configured to provide electrical power and audio functionality to the radiotelephone card independent of the PCMCIA interface. An adapter according to the present invention is configured to be substantially flush with the housing of an electronic device.

12 Claims, 4 Drawing Sheets

APPARATUS FOR PROVIDING OPERATIONAL POWER TO A RADIOTELEPHONE CARD CONNECTED TO A PCMCIA INTERFACE

FIELD OF THE INVENTION

The present invention relates generally to electronic devices and, more particularly, to electronic devices with peripheral devices connected thereto via PCMCIA interfaces.

BACKGROUND OF THE INVENTION

Electronic devices, such as computers, may use various peripheral devices to increase flexibility and adaptability to various work environments. This may be especially true for computing devices such as hand-held computer terminals, lap-top computers, and vehicle mounted computing devices. Prior to development of standards for connecting peripheral devices to computers, computers often accepted only limited models and brands of peripheral devices. For example, memory cards often were designed to be plugged only into specific computer models.

A need to standardize the connection of peripheral devices to computing devices was soon recognized, however. Initially, the standardization of interchangeable memory cards was developed. These interchangeable memory cards were sometimes used in lieu of floppy diskettes for exchanging data or for expanding the memory of a computing device. The Personal Computer Memory Card International Association (PCMCIA) was formed by several memory card manufacturers in the late 1980s to define memory card physical design, computer socket design, electrical interface, and associated software (referred to as the PCMCIA interface standard).

Memory cards complying with the PCMCIA interface standard (hereinafter "PCMCIA cards") are relatively small, having a length and width roughly the size of a credit card. PCMCIA cards are designed to slide into a receiving slot of a computing device. At one end of a PCMCIA card is an interface section which is in essence a female portion of a connector that mates with a male end in a receiving device.

The success of interchangeable PCMCIA memory cards led to the development of other types of peripheral devices using the PCMCIA interface standard. These devices included modems, sound cards, floppy disk controllers, hard drives, Global Positioning System (GPS) cards, local area network (LAN) cards, pagers, and radiotelephone cards. For example, a PCMCIA radiotelephone card may be inserted into the same PCMCIA interface of a computer as other PCMCIA devices.

Unfortunately, current PCMCIA interfaces may have limitations for certain types of peripheral devices connected thereto. For example, a PCMCIA interface may not provide sufficient electrical power to enable operation of a radiotelephone card. In addition, audio input and output, both to and from a radiotelephone card, may not be possible without some modification to a PCMCIA interface. To overcome these drawbacks, adapters are conventionally utilized with radiotelephone cards to provide adequate operational power from a computing device to a radiotelephone card and to provide audio input and output to and from a radiotelephone card.

Unfortunately, adapters utilized with radiotelephone cards to provide sufficient operational power may be somewhat large devices that protrude undesirably from a computing device. Large capacitors are conventionally used to store power from a PCMCIA interface until a level adequate for radiotelephone operation is obtained. Accordingly, obtaining power via a PCMCIA interface may somewhat limit size reduction for these radiotelephone card adapters. With portable computing devices, such as hand-held computing devices, these adapters may be particularly undesirable.

FIG. 1 illustrates a prior art adapter 10 used to provide operational power and audio functionality to a radiotelephone card 12 connected to a PCMCIA interface 13. The illustrated radiotelephone card 12 is located within a PCMCIA slot 14 of an electronic device 16. As is understood by those skilled in the art, the radiotelephone card 12 functions as a radiotelephone transceiver for transmitting and receiving radiotelephone communications. The illustrated adapter 10 is electrically connected to an interface (not shown) on the front end 12a of the radiotelephone card 12 and is secured thereto via a pair of clips 18a, 18b. An antenna 20 is pivotally connected to an end 22 of the illustrated adapter 10. The antenna 20 is electrically connected to a transceiver within the radiotelephone card 12 via an interface on the front end 12a of the radiotelephone card 12.

An alternative method of providing adequate operational power and audio functionality to radiotelephone cards via a PCMCIA interface may involve modifying the PCMCIA interface. Unfortunately, other PCMCIA peripheral cards may not work properly in a modified PCMCIA interface.

SUMMARY OF THE INVENTION

It is therefore an object of the present invention to provide adequate operational power and audio functionality to radiotelephone cards inserted within PCMCIA interfaces of electronic devices without requiring modification of the PCMCIA interface.

It is another object of the present invention to provide adequate operational power and audio functionality to radiotelephone cards inserted within PCMCIA interfaces of electronic devices without requiring bulky adapters.

These and other objects of the present invention may be provided by an adapter that can be removably secured to a radiotelephone card connected to a PCMCIA interface of an electronic device and that is configured to provide electrical power and audio functionality to the radiotelephone card. A radiotelephone card is removably secured within a PCMCIA peripheral device slot such that a first end of the PCMCIA card is electrically connected to a PCMCIA interface. An adapter according to the present invention is removably secured to a second end of the radiotelephone card and receives electrical power and audio input and output signals directly from an electronic device, and not via the PCMCIA interface. Electrical power and audio input and output signals are then provided directly to the radiotelephone card via the adapter. An antenna may be movably mounted to the adapter and electrically connected to the radiotelephone card.

Electronic devices incorporating the present invention are advantageous because adequate operational power and audio functionality can be provided to a radiotelephone card within a PCMCIA slot without modifying the PCMCIA interface. Furthermore, PCMCIA cards for other peripheral devices may be utilized within the same PCMCIA slot without compatibility concerns.

Adapters according to the present invention may be configured to be substantially flush with the housing of an electronic device. Accordingly, adapters according to the present invention are particularly advantageous when utilized with radiotelephone cards inserted in small devices such as hand-held computers, personal digital assistants (PDAs), and the like.

BRIEF DESCRIPTION OF THE DRAWINGS

The accompanying drawings, which are incorporated in and constitute a part of the specification, illustrate an embodiment of the invention and, together with the description, serve to explain principles of the invention.

DETAILED DESCRIPTION OF THE INVENTION

Figure 1:
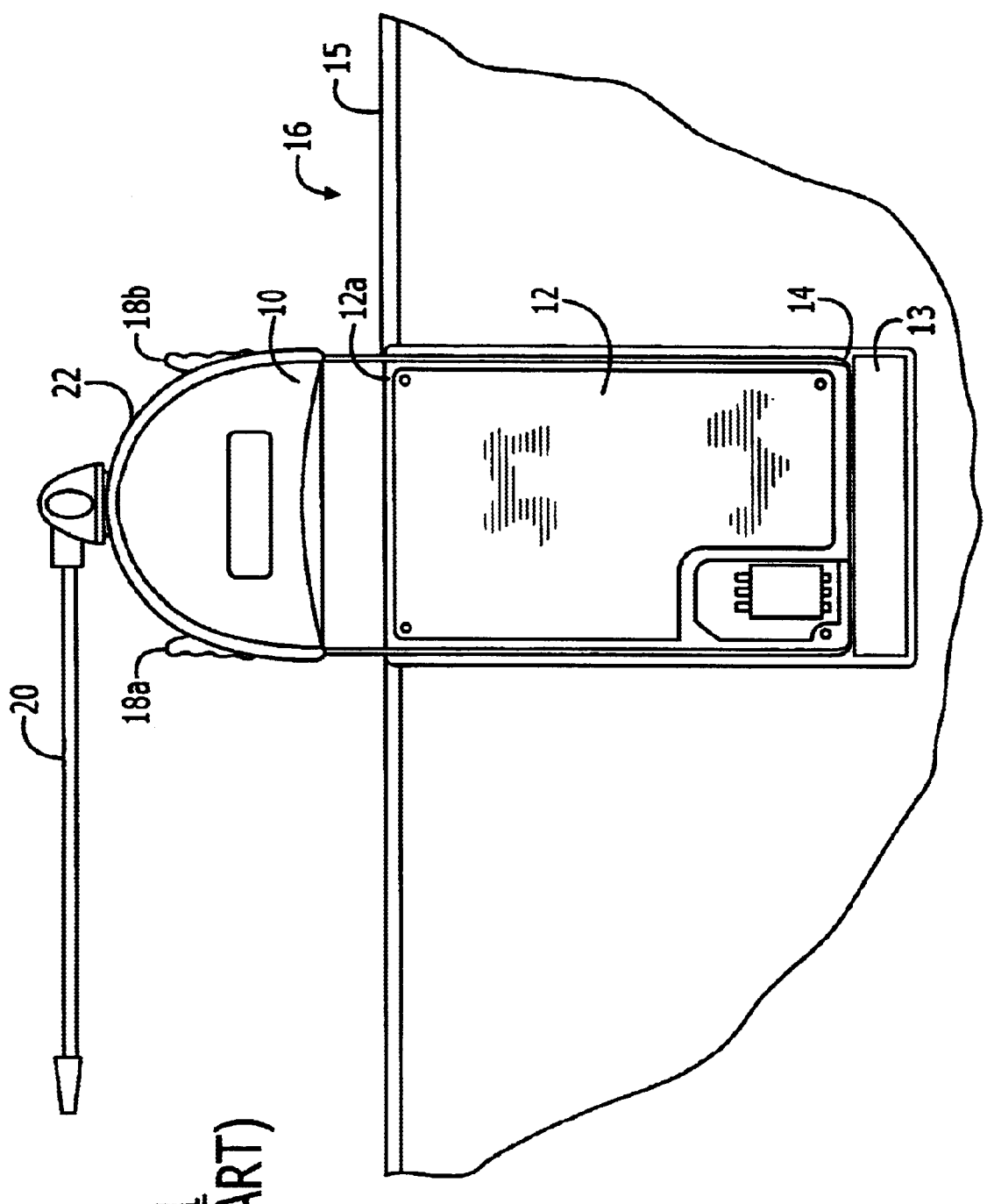
FIG. 1 illustrates a conventional adapter for providing electrical power to a radiotelephone card inserted within a PCMCIA slot of an electronic device.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring back to FIG. 1, the illustrated radiotelephone card 12 is inserted into a PCMCIA slot 14 located within the housing 15 of an electronic device 16, such as a hand-held or lap-top computing device. Within the PCMCIA slot 14 is a PCMCIA interface 13 which has a plurality of pins (not shown) that form a male connector configured to receive a corresponding female connector of a PCMCIA card. The radiotelephone card 12 has a corresponding plurality of sockets (not shown) which form a female connector configured to receive the corresponding pins of the PCMCIA interface 13.

The PCMCIA interface pins are connected internally and electrically to a data processor within the electronic device 16, as is known by those skilled in the art, by a series of electrical connections, such as wires, printed circuit traces, or electrical ribbon (not shown). The sockets in the radiotelephone card 12 are electrically connected to a radiotelephone transceiver in the radiotelephone card 12, as is known to those skilled in the art. When the PCMCIA interface pins engage the sockets of the radiotelephone card 12, electrical signals can be exchanged between the radiotelephone transceiver inside the radiotelephone card 12 and the electronic device 16.

Within the illustrated adapter 10 of FIG. 1 are a plurality of capacitors (not shown) which are configured to store power transmitted to the radiotelephone card 12 via the PCMCIA interface 13. In addition, a separate audio jack (not shown) may be provided for providing audio input and output to and from the radiotelephone card.

Figure 2:
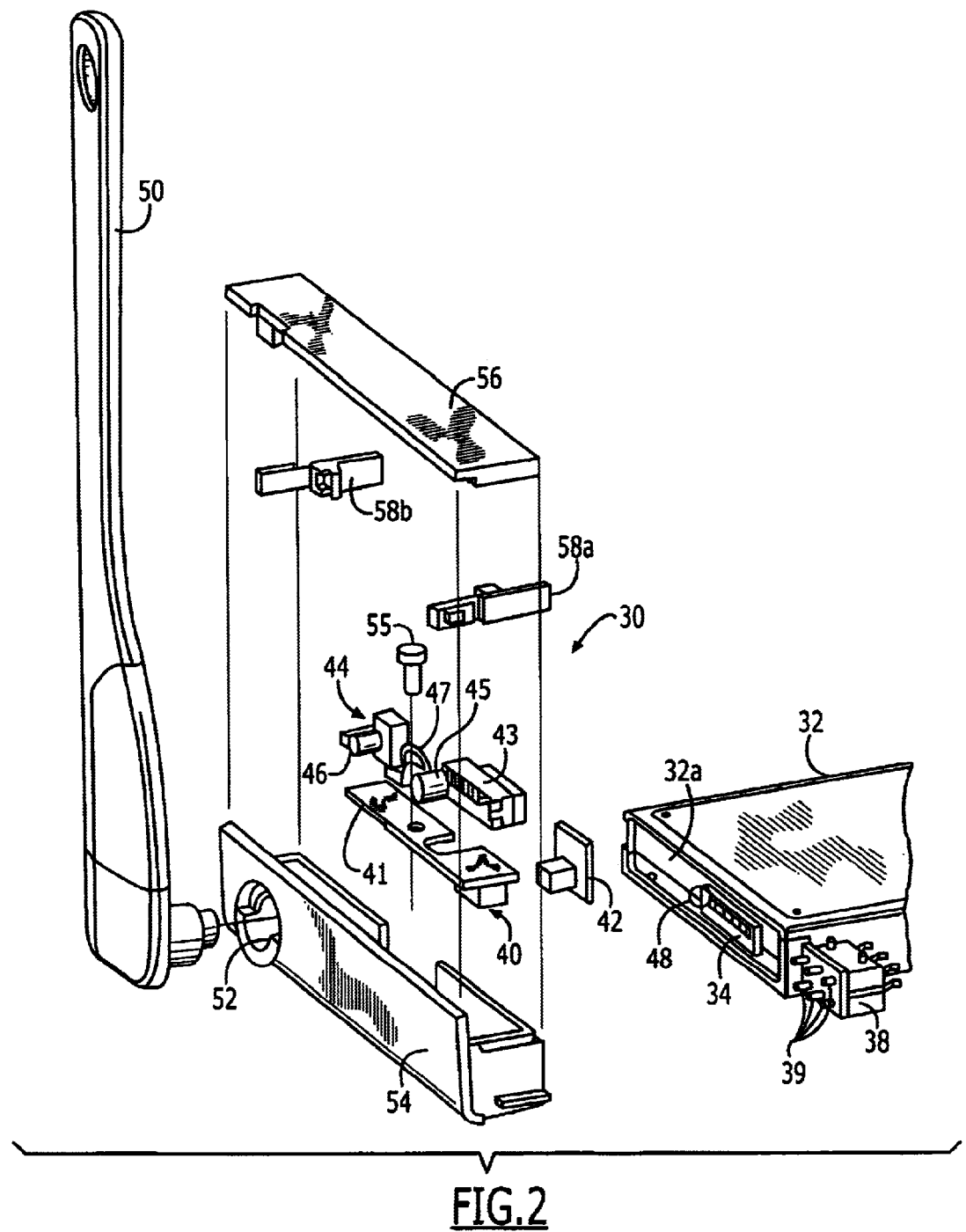
FIG. 2 illustrates, in an exploded perspective view, an adapter for providing electrical power and audio functionality to a radiotelephone card inserted within a PCMCIA slot of an electronic device, according to an embodiment of the present invention.

Referring now to FIG. 2, an adapter 30 according to an embodiment of the present invention for providing operational power and audio functionality to a radiotelephone card 32 inserted within an electronic device is illustrated in an exploded perspective view. The illustrated adapter 30 is configured to receive power from a power supply (not shown) located within the electronic device and provide power to the radiotelephone card 32 via an interface 34 on a front end 32a of the radiotelephone card 32. The illustrated adapter 30 is also configured to provide audio input and output functions to and from the radiotelephone card 32 without requiring modification of the PCMCIA interface.

It is to be understood that the present invention is not limited to use with PCMCIA interfaces. The illustrated adapter 30 may be utilized with radio cards connected to electronic devices via other non-PCMCIA interfaces, as well.

A connector 38 is mounted within the electronic device and is electrically connected to a power supply within the device. The illustrated connector 38 includes a plurality of contacts 39. An electrical assembly 40 that includes a substrate 41, and first and second connectors 42 and 43, serves as means for providing electrical power and audio functionality to the radiotelephone card 32 from connector 38. The first connector 42 is configured to electrically connect with the contacts 39 of the connector 38 when the adapter 30 is removably secured to the radiotelephone card 32. The illustrated substrate 41 also includes a second connector 43 that is configured to electrically connect with the interface 34 on the front end 32a of the radiotelephone card 32. Electrical power is thereby transmitted via the electrical assembly 40 from a power supply within an electronic device to the radiotelephone card 32, eliminating the need for capacitors storing electrical power received through the PCMCIA interface. In addition, audio input and output functions are also provided to and from the radiotelephone card 32 via connector 38 and electrical assembly 40.

Still referring to FIG. 2, the illustrated adapter 30 also includes an antenna connector assembly 44. The antenna connector assembly 44 includes first and second antenna connectors 45 and 46 electrically connected via cable 47, as illustrated. The first antenna connector 45 is configured to electrically connect with an antenna outlet connection 48 in the interface 34 on the front end 32a of the radiotelephone card 32. The second antenna connector 46 is configured to electrically connect with an antenna 50 through an aperture 52 located within the bottom housing 54 of the adapter 30.

In the illustrated embodiment, the electrical assembly 40 and antenna connector assembly 44 are secured to the adapter bottom housing 54 via fastener 55. A top housing 56 is configured to enclose the electrical assembly 40 and antenna connector assembly 44 within the adapter bottom housing 54, as illustrated. Clips 58a and 58b are configured to secure the adapter 30 to the front end 32a of the radiotelephone card 32.

Figure 3:
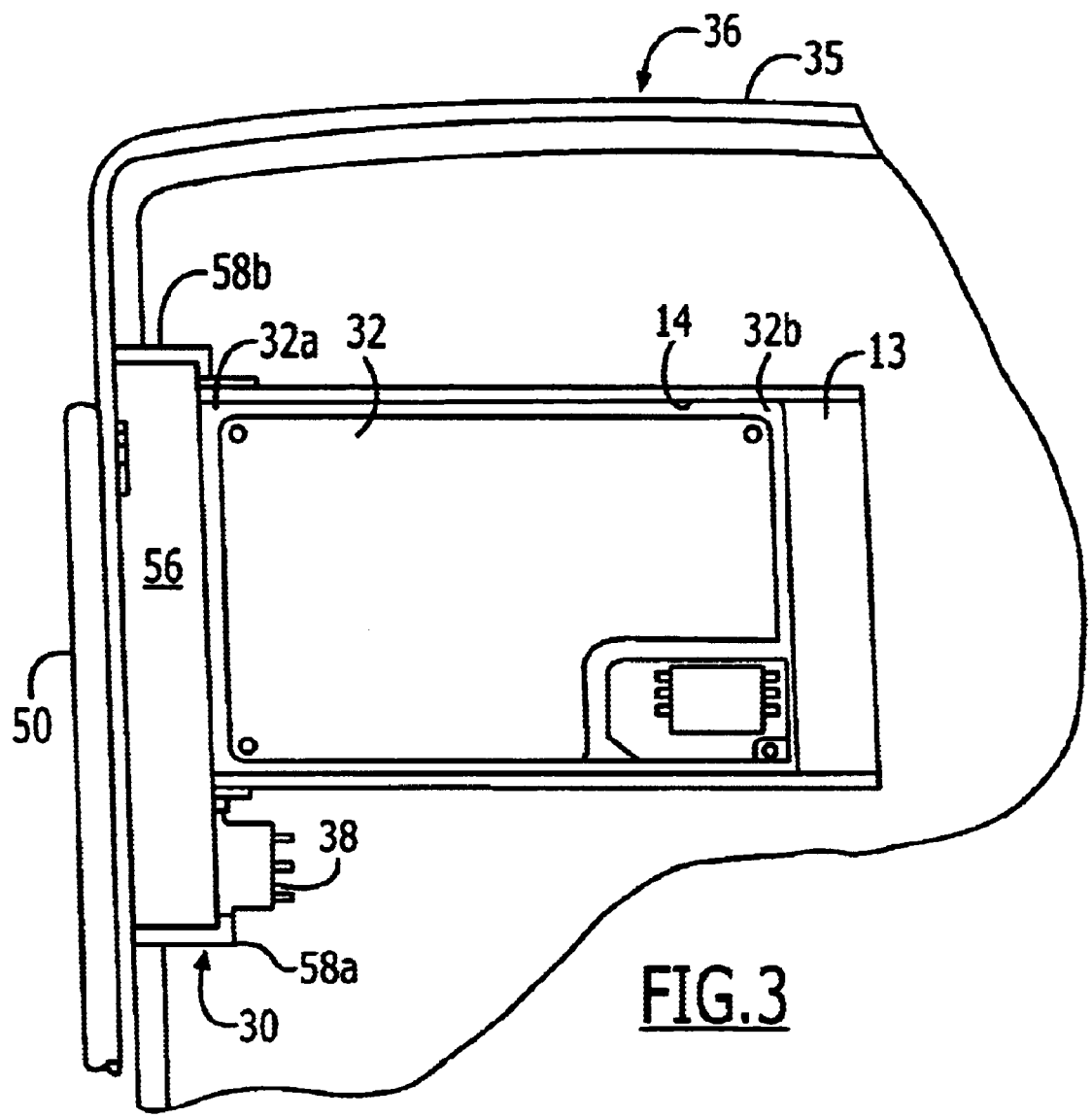
FIG. 3 illustrates an electronic device having a radiotelephone card and adapter, according to the present invention, in an installed configuration.

Referring now to FIG. 3, an electronic device 36 with an adapter 30 and radiotelephone card 32 in an installed configuration is illustrated. The back end 32b of the radiotelephone card 32 is electrically connected, as described above, with a PCMCIA interface 13 located in a PCMCIA slot 14 within the housing 35 of the electronic device 36. The adapter 30 is electrically connected with an interface on the front end 32a of the radiotelephone card 32. The adapter 30 is configured so as to have a substantially flush configuration with the electronic device housing 35 as illustrated. An antenna 50 is configured to pivotally mount to the adapter, as illustrated.

Figure 4:
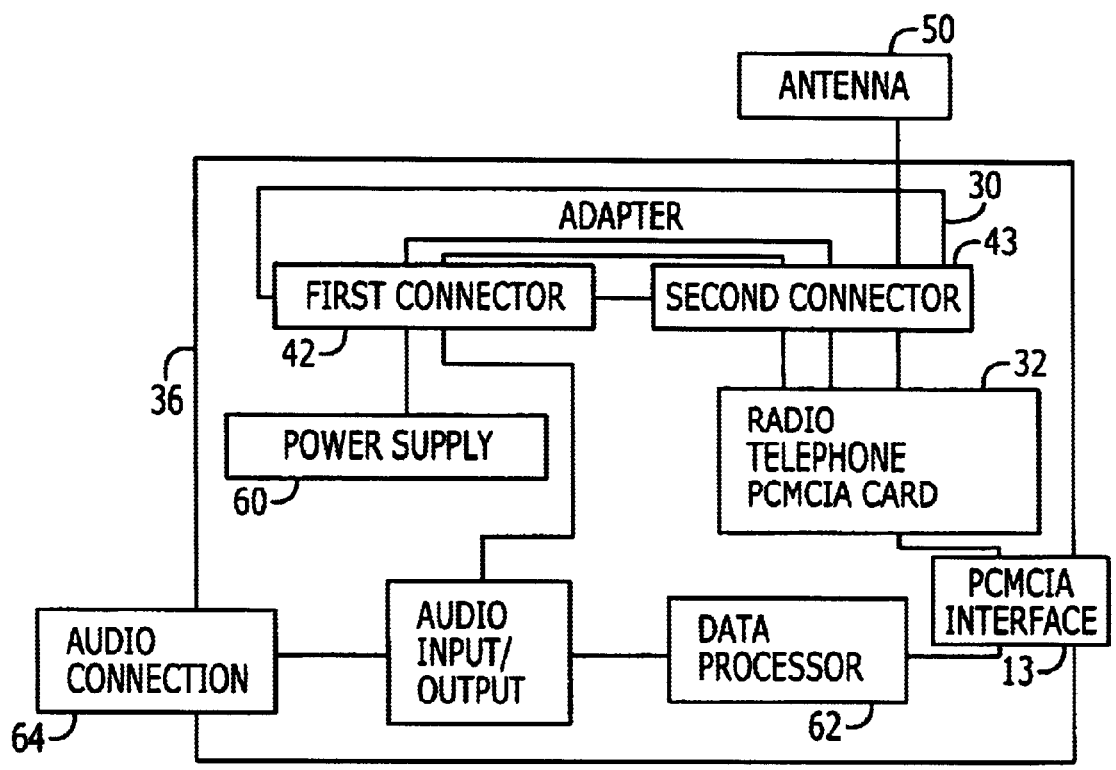
FIG. 4 is a schematic electrical diagram of an electronic device incorporating an adapter according to the present invention.

Referring now to FIG. 4, a schematic electrical diagram of an electronic device 36 incorporating an adapter according to the present invention is illustrated. A power supply 60 transmits power to the radiotelephone card 32 via adapter 30 which is removably secured to the electronic device 36 and radiotelephone card 32 via first and second connectors 42 and 43. A data processor 62, electrically connected to the radiotelephone card via a PCMCIA interface 13, also provides audio input and output functions to and from the radiotelephone card 32 via adapter 30. An audio connection 64 may be provided virtually anywhere in the housing of the electronic device 36 for providing audio input/output to and from the radiotelephone card 32. An antenna 50 is electrically connected to the radiotelephone card via the adapter 30.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An electronic device, comprising:

a housing;

a peripheral device slot within said housing, said peripheral device slot comprising a peripheral device interface;

a peripheral device card removably secured within said peripheral device slot such that a first end of said peripheral device card is electrically connected to said peripheral device interface;

a power connector interface, wherein said power connector interface is configured to provide electrical power from said electronic device independent of said peripheral device interface;

an adapter removably secured to a second end of said peripheral device card and to said power connector interface such that said adapter is electrically connected to said power connector interface and such that said peripheral device card receives electrical power from said electronic device independent of said peripheral device interface; and an antenna pivotally mounted to the adapter.

2. An electronic device according to claim 1 wherein said adapter is substantially flush with said electronic device housing.

3. An electronic device according to claim 1 further comprising means for providing audio input and output to and from said peripheral device card via said adapter.

4. An electronic device according to claim 1 wherein said peripheral device card comprises a radiotelephone transceiver.

5. An electronic device according to claim 1 wherein said electronic device comprises a data processor.

6. An electronic device according to claim 1 wherein said peripheral device interface is a PCMCIA interface and wherein said peripheral device card is a PCMCIA card.

7. An electronic device, comprising:

a housing;

a peripheral device slot within said housing, said peripheral device slot comprising a PCMCIA interface;

a radiotelephone card removably secured within said peripheral device slot such that a first end of said radiotelephone card is electrically connected to said PCMCIA interface;

a power connector interface, wherein said power connector interface is configured to provide electrical power from said electronic device independent of said PCMCIA interface;

an adapter removably secured to a second end of said radiotelephone card such that said adapter is substantially flush with said electronic device housing, said adapter being removably secured to said power connector interface such that said adapter is electrically connected to said power connector interface and such that said radiotelephone card receives electrical power from said electronic device independent of said PCMCIA interface; and an antenna pivotally mounted to the adapter.

8. An electronic device according to claim 7 further comprising means for providing audio input and output to and from said radiotelephone card via said adapter.

9. An electronic device according to claim 7 wherein said electronic device comprises a data processor.

10. An apparatus that provides electrical power to a radiotelephone card connected to a PCMCIA interface within an electronic device, said apparatus comprising:

a power connector interface, wherein said power connector interface is configured to provide electrical power from said electronic device independent of said PCMCIA interface;

a connector that is removably secured to said radiotelephone card and is electrically connected to said power connector interface such that said radiotelephone card receives electrical power from said electronic device independent of said PCMCIA interface; and an antenna pivotally mounted to the connector.

11. An apparatus according to claim 10 wherein said apparatus is configured to be substantially flush with a housing of said electronic device.

12. An apparatus according to claim 10 further comprising means for providing audio input and output to and from said radiotelephone card.

* * * * *